United States Patent
Alavala et al.

(10) Patent No.: US 12,032,466 B2
(45) Date of Patent: Jul. 9, 2024

(54) OPTIMIZING CPU REQUESTS AND LIMITS FOR A POD BASED ON BENCHMARKED HARDWARE

(71) Applicant: International Business Machines Corporation, Armonk, NY (US)

(72) Inventors: Ramakrishna Alavala, Podili (IN); Krishnan Venkitasubramanian, Bengaluru (IN); Sundaragopal Venkatraman, Chennai (IN); Renganathan Sundararaman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 17/305,021

(22) Filed: Jun. 29, 2021

(65) Prior Publication Data

US 2022/0413985 A1 Dec. 29, 2022

(51) Int. Cl.
*G06F 9/48* (2006.01)
*G06F 11/34* (2006.01)
*G06F 16/245* (2019.01)

(52) U.S. Cl.
CPC ........ *G06F 11/3428* (2013.01); *G06F 9/4881* (2013.01); *G06F 16/245* (2019.01)

(58) Field of Classification Search
CPC .................................................... G06F 9/4881
See application file for complete search history.

(56) References Cited

U.S. PATENT DOCUMENTS

2011/0213911 A1* 9/2011 Eidus .................... G06F 9/4856
718/1

FOREIGN PATENT DOCUMENTS

| CN | 106027643 B | 10/2018 |
| CN | 110287029 A | 9/2019 |

OTHER PUBLICATIONS

"Enhanced Platform Awareness in Kubernetes," Intel, https://builders.intel.com/docs/networkbuilders/enhanced-platform-awareness-in-kubernetes-application-note.pdf.
(Continued)

*Primary Examiner* — Charlie Sun
(74) *Attorney, Agent, or Firm* — Eric W. Chesley (57) ABSTRACT

A computer implemented method comprises receiving a request to provision a container as a software container on a current node of the cluster. The method further comprises accessing a performance information data store (PIDS) to obtain a record associated with the container that includes benchmarked performance metrics including container-required resources associated with a benchmark-specified node of the container. The method further comprises accessing the PIDS to obtain a record associated with the current node of the cluster that includes current-node performance metrics associated with the current node. The method further comprises comparing the benchmarked performance metrics with the current node performance metrics to determine that a difference exists, and conditioned upon the difference existing adjusting, with a resource adjustment calculator, the container-required resources based on the determination of how much of a difference exists. The method then provisions the container on the current node with adjusted container-required resources.

20 Claims, 5 Drawing Sheets

(56) References Cited

OTHER PUBLICATIONS

"System and Method to efficiently profile the pods in a Kubernetes Cluster," Dec. 19, 2019, https://priorart.ip.com/IPCOM/000260761.
Automatically adjust pod resource levels with the vertical pod autoscaler, printed Feb. 18, 2021, https://docs.openshift.com/container-platform/4.6/nodes/pods/nodes-pods-vertical-autoscaler.html.
Chapter 2. Controlling pod placement onto nodes (scheduling), printed Feb. 13, 2021, https://access.redhat.com/documentation/en-US/openshift_container_platform/4.2/html/nodes/controlling-pod-placement-onto-nodes-scheduling.
Harrison Harnisch, "Optimizing Kubernetes resource allocation in production," Dec. 9, 2018, printed Feb. 13, 2021, https://opensource.com/article/18/12/optimizing-kubernetes-resource allocation-production.
Manage compute resources, https://www.elastic.co/guide/en/cloud-on-k8s/current/k8s-managing-compute-resources.html.
Santhosh Nagaraj, "Setting the right requests and limits in Kubernetes," Published Sep. 2020, printed Feb. 13, 2021, https://learnk8s.io/setting-cpu-memory-limits-requests.
Mell, P., Grance Timothy, "The NIST Definition of Cloud Computing", Special Publication 800-145, Recommendations of the National Institute of Standards and Technology, US Department of Commerce, 7 pages (Sep. 2011).

\* cited by examiner

OPTIMIZING CPU REQUESTS AND LIMITS FOR A POD BASED ON BENCHMARKED HARDWARE

BACKGROUND

Disclosed herein is a system and related method for optimizing CPU requests AND limits for A POD based on benchmarked hardware.

Many computer nodes may exist in a cloud environment. Self-contained units, known as pods, may be deployed on computer nodes within the cloud. However, not all nodes in the cloud may be identical or have similar characteristics. Some nodes may be significantly more powerful than others, and thus, differing characteristics may create differences in how a pod might run on a particular node.

SUMMARY

A computer implemented method comprises using a processor of a cluster manager that operates on a cluster of heterogeneous computer nodes. The method comprises receiving, by a scheduler of the cluster manager, a request to provision a container as a software container on a current node of the cluster. The method further comprises accessing a performance information data store (PIDS) to obtain a record associated with the container that includes benchmarked performance metrics including container-required resources associated with a benchmark-specified node of the container. The method further comprises accessing the PIDS to obtain a record associated with the current node of the cluster that includes current-node performance metrics associated with the current node. The method further comprises comparing the benchmarked performance metrics with the current node performance metrics to determine that a difference exists and how much of a difference exists, and conditioned upon the difference existing adjusting, with a resource adjustment calculator (RAC), the container-required resources based on the determination of how much of a difference exists. The method then provisions the container on the current node with adjusted container-required resources.

Embodiments may take the form of a cluster manager apparatus having a processor and memory that may be used to implement the methods described herein.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| General Acronyms | |
|---|---|
| API | application program interface |
| ARM | advanced RISC machine |
| CD-ROM | compact disc ROM |
| CMS | content management system |
| CoD | capacity on demand |
| CPU | central processing unit |
| CUoD | capacity upgrade on demand |
| DPS | data processing system |
| DVD | digital versatile disk |
| EVC | expiring virtual currency (a virtual currency having an expiration date, or subject to other virtual currency usage rules; local virtual currencies with expiration dates) |
| EVCU | expiring virtual currency (units) |
| EPROM | erasable programmable read-only memory |
| FPGA | field-programmable gate arrays |
| HA | high availability |
| IaaS | infrastructure as a service |
| I/O | input/output |

TABLE 1-continued

| General Acronyms | |
|---|---|
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| VCUR | virtual currency usage rules |
| WAN | wide-area network |

Data Processing System in General

Figure 1A:
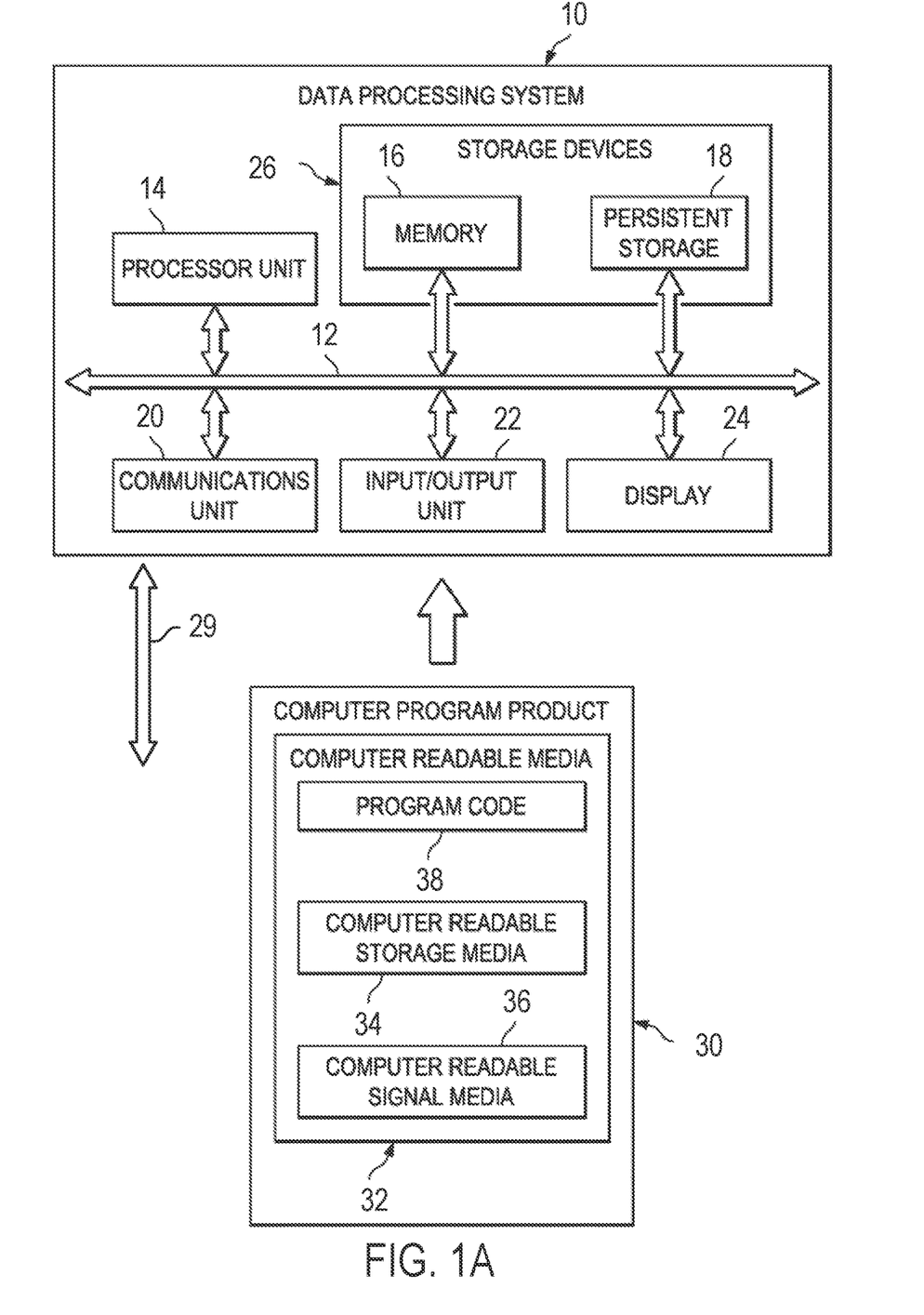
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36.

The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
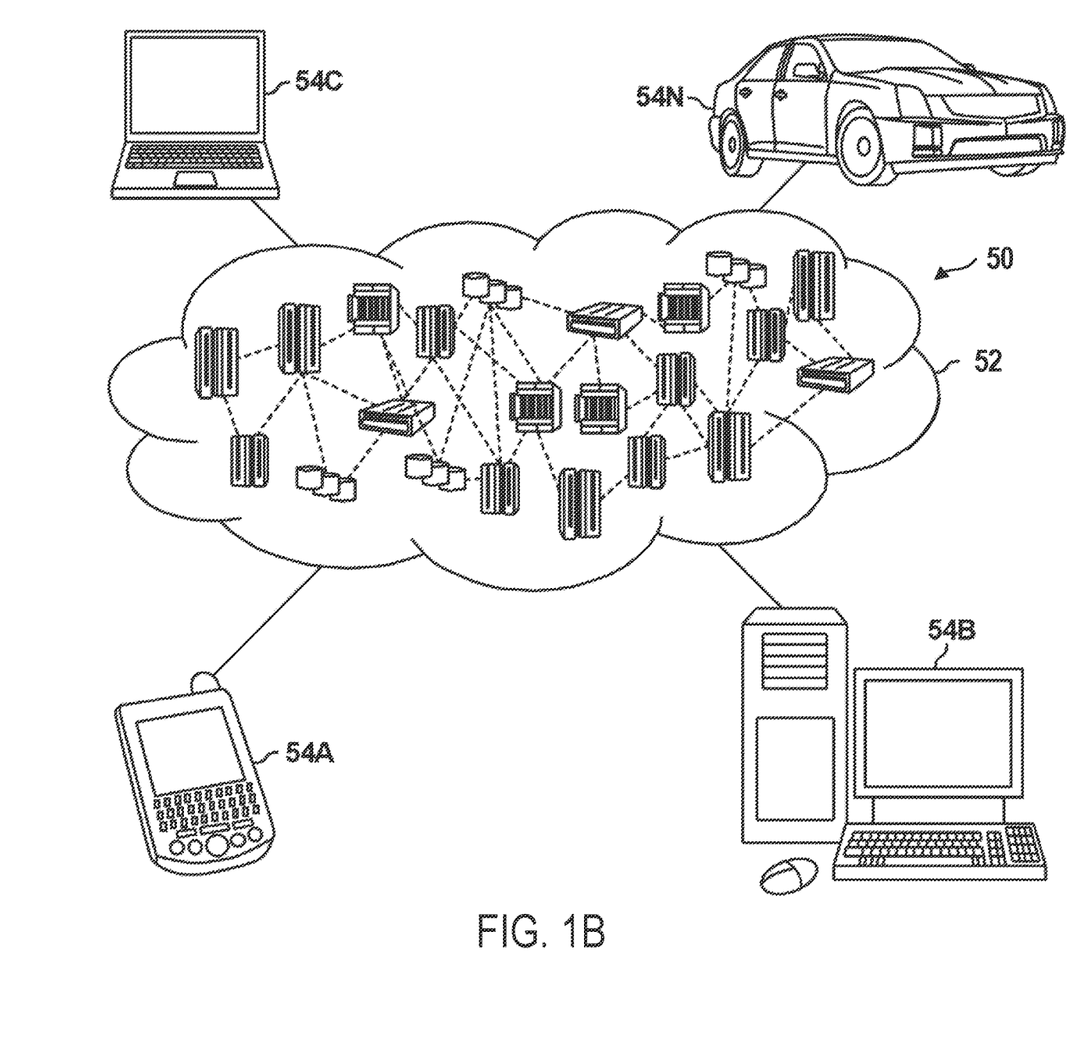
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
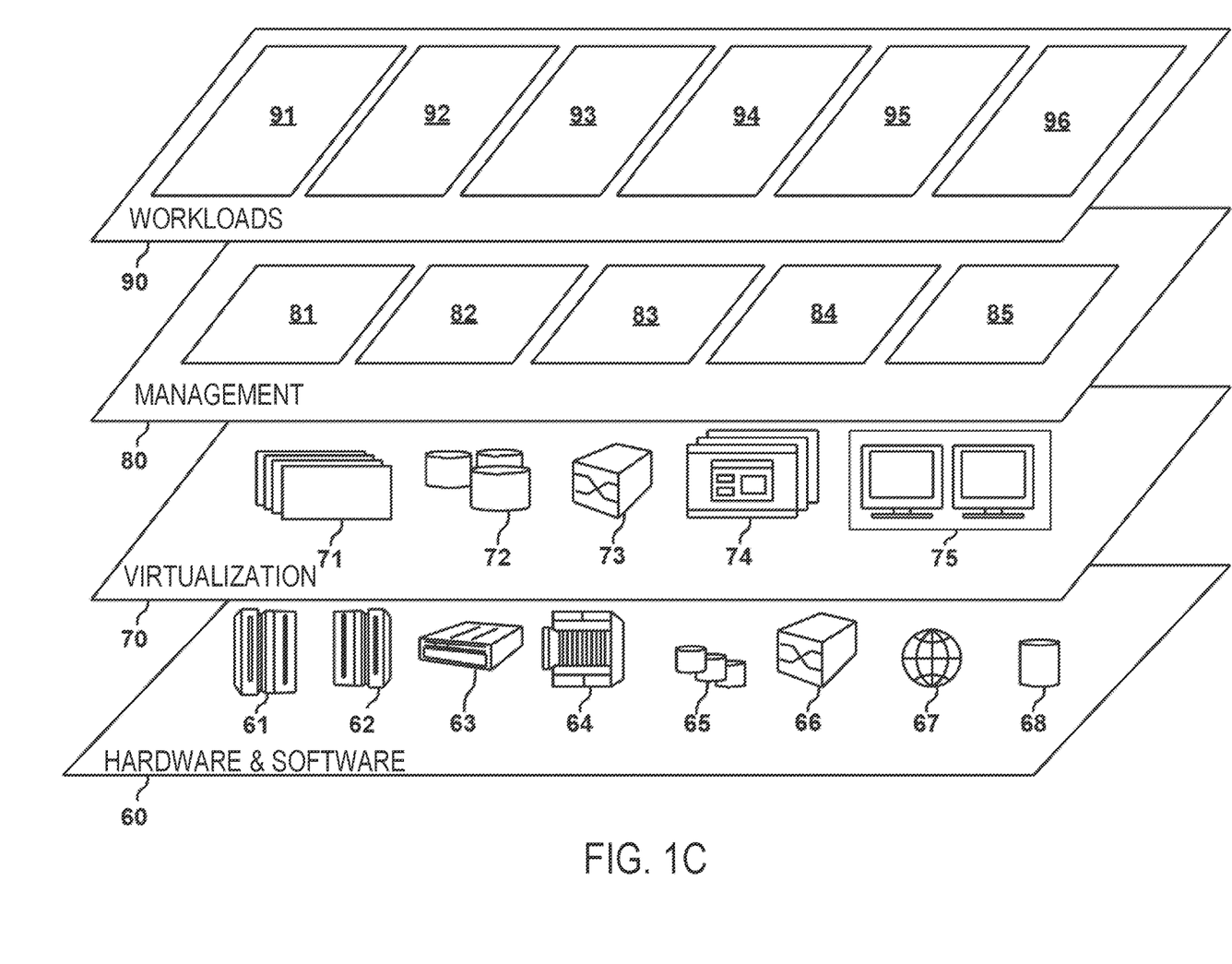
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52 as well as the computing devices 54A-N may be a DPS 10.
Computer Readable Media The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Optimizing CPU Requests and Limits for a Pod Based on Benchmarked Hardware

The following application-specific acronyms may be used below:

TABLE 2

| Application-Specific Acronyms | |
| --- | --- |
| PPB | processor performance benchmark |
| HPI | hardware performance indicator |
| PIDS | performance information data store |
| RAC | resource adjustment calculator |
| RPE | Relative server Performance Estimate |
| SPEC | Standard Performance Evaluation Corporation |
| TPC | Transaction Processing performance Council |

The use of a cloud architecture, that is illustrated by way of example in FIGS. 1B and 1C above, has resulted in significant improvements to the efficiency of computer operations. By running many different applications in many different contexts, the cloud architecture may help to ensure that resources are used to their maximum capabilities. The cloud may comprise nodes that are interconnected and managed to help ensure that the cloud and applications running within it are efficient.

One common component of modern cloud architectures is the container.

A container is a software package that contains everything a particular piece of software needs to run. This includes the executable program as well as system tools, libraries, and settings. Containers provide a level of security, since the software will not affect the host operating system. Containers give developers the ability to create predictable environments that are isolated from other applications. Containers can also include software dependencies needed by the application, such as specific versions of programming language runtimes and other software libraries. Kubernetes® is an open-source container-orchestration system for automating computer application deployment, scaling, and management. A Kubernetes® cluster is a set of node machines (also "compute machines" or "nodes") for running containerized applications.

A Kubernetes® Pod is the smallest deployable computing unit in this container scheduling and orchestration environment. The pod is a grouping of one or more containers that operate together. Pods reside on nodes, and more than one pod can share the same node. The containers within each pod share common networking and storage resources from that host node, as well as specifications that determine how the containers run. Although a pod can encapsulate many containers, typically each pod has only one container or a small number of tightly integrated containers. Although the term "pod" is used in the context of Kubernetes® in general, it is defined and used herein generically to refer to any grouping of one or more containers that operate together.

The contents of a pod are scheduled and located together, modeling an application-specific logical host. The shared context of a pod is set by facets of isolation, such as Linux® namespaces or cgroups. For an individual pod, single applications can be further isolated. An operator can expose information about the pod, node and/or containers by using environment variables. Pod environment variables tell the application in the pod's container(s) where to find resources that it needs, or how to configure a component. This information is injected into the container at runtime. While nodes also contain environment variables, these are not exposed to the containers. Kubernetes® environment variables are statically defined or written by the user.

Figure 2:
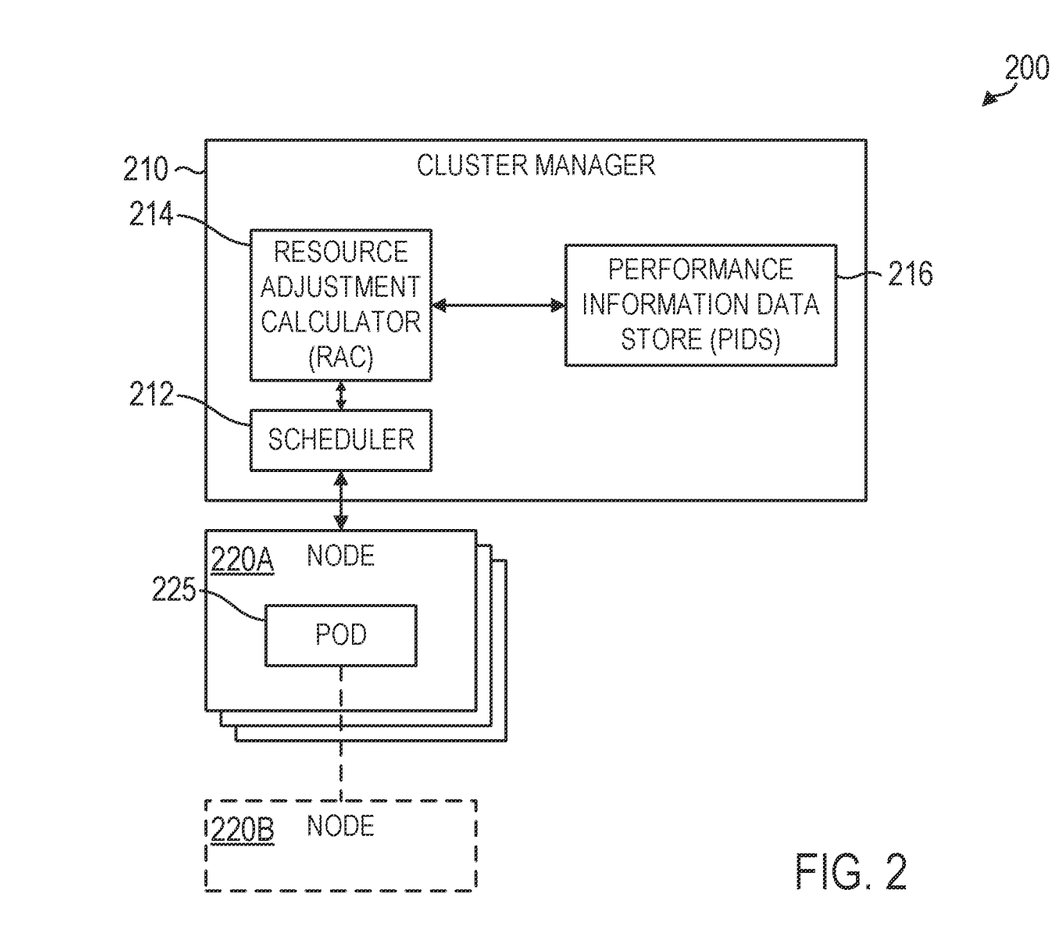
FIG. 2 is a block diagram that illustrates a cluster manager, according to some implementations.

FIG. 2 is a block diagram that illustrates an example, according to some embodiments, of a cluster 200, such as a Kubernetes® cluster, for implementing various embodiments disclosed herein within a cloud, such as cloud computing environment 52. In these embodiments, a cluster manager 210 comprises the components of a scheduler 212 that may be used for scheduling resources on nodes 220A, such as DPSs 10, to pods 225, a resource adjustment calculator (RAC) 214 that is used to adjust allocated resources that are dependent upon the underlying hardware, and a performance information data store (PIDS) 216 in which various performance parameters associated with the cluster nodes 220A and pods 225 may be stored.

In a heterogenous Kubernetes® cluster 200, these nodes 220A, may be of different types of hardware (e.g., based on parameters such as model, architecture, version, etc.). As a result, the performance (processing capability) of each type of hardware model may be different. However, a traditional cluster manager 210, whose job it is to oversee the provisioning, control, and operation of pods 225 within the nodes 220A in a Kubernetes® cluster 200 does not differentiate the nodes 220 based on the nodes' hardware performance, which may be represented by a hardware performance indicator (HPI). Pods 225 provisioned on these different type of nodes 220A may not provide the same performance due to underlying architectural differences.

By way of example, a pod creator, such as a developer, may specify an operational resource limits baseline that is based on a particular high-capacity CPU model node—a pod-specified (or benchmark-specified) node 220B, indicated in dashed lines in FIG. 2, that may or may not exist at a time of provisioning the pod 225. These limits may include, among other things, the HPI, and may be stored in the PIDS 216, for example, along with an association or link to the particular pod 225 it represents.

In the example, the cluster manager 210 requests the provisioning of the pod 225 on an existing node 220A in the cluster. However, the available node 220A to host the pod 225 is a lower-capacity CPU model node 220A than the pod-specified node 220B (the node the pod was benchmarked/specified for). In this case, if the pod 225 were to be provisioned by the cluster manager 210 on the currently available lower-capacity CPU model node 220A with the provisions of the operational resource limits baseline provided for the pod-specified node 220B by the developer (from the PIDS 216), the lower-capacity node 220A may not provide the required capability or meet the specified requirements.

To address this, the PIDS 216 may contain information (identifying information, performance information (e.g., HPI), etc.), about each of the nodes 220A in the cluster 200. The PIDS 216 may comprise records for various node 220A, 220B metrics, which may include any or all of the following:
- a processor performance benchmark (PPB) (e.g., the Relative server Performance Estimate 2 (RPE2), which is a known performance benchmark metric);
- a type of node;
- a model of the node;
- a node performance indicator value, such as the IBM® xPerf, which is a "relative performance" metric for a system under consideration relative to other members of the IBM System X® family of servers, and/or rPerf (Relative Performance), which is an estimate of commercial processing performance relative to other IBM UNIX® systems, and is derived from an IBM analytical model which uses characteristics from IBM internal workloads, Transaction Processing performance Council (TPC) and Standard Performance Evaluation Corporation (SPEC) benchmarks.

In addition to node-based records, the PIDS 216 may further comprise pod-based records identifying information on pods 225 that are deployable within the cluster 200. In particular, each pod record may comprise benchmarked node 220B characteristics that were provided by, e.g., a developer, that indicate an intended deployment node 220A platform.

The scheduler 212 may be responsible for the actual provisioning of the pod 225 on the deployment node 220A. In order to ensure proper performance, however, the RAC 214 is responsible for determining and handling differences between the pod-specified node 220B (that the pod 225 was originally benchmarked for) and an available deployment node 220A (at which the pod 225 will be currently provisioned on). While provisioning the pod 225, the scheduler 212 may check the PIDS 216 for the hardware model and related information of a currently available node 220A. If the hardware model of the currently available deployment node 220A is different (possibly based on thresholds of performance differences) than the benchmarked pod-specified node 220B that the pod 225 was originally benchmarked and sized for, then the analytic engine RAC 214 recalculates the requested pod's 225 resource requirements that takes into account the difference in hardware model between the benchmark pod-specified node 220B and the currently available node 220A. The scheduler 212 may then assign revised node resources for the pod 225 as per the available deployment node's 220A hardware model, and deploy the pod using the revised node resources.

Figure 3:
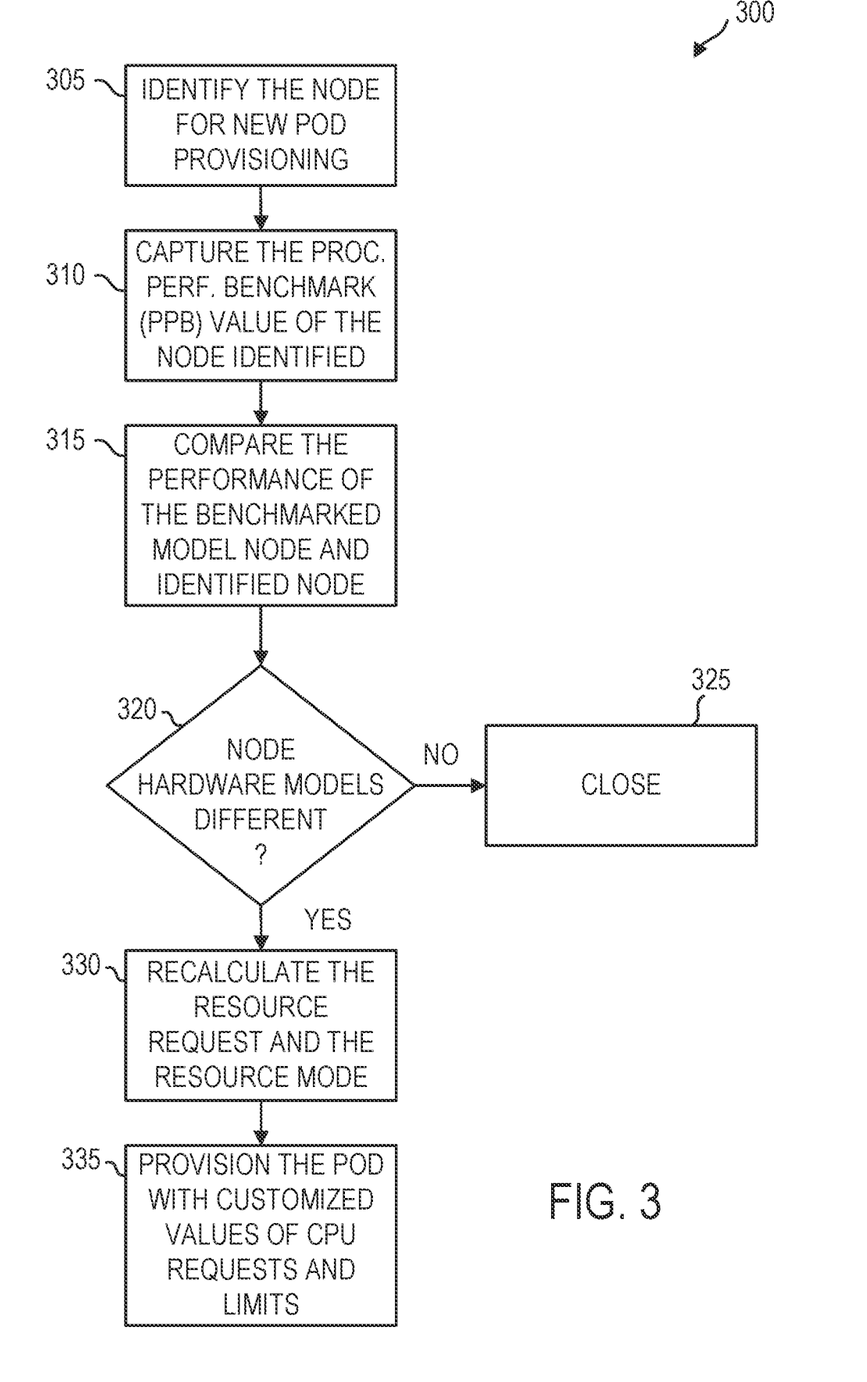
FIG. 3 is a flowchart illustrating a process for implementing the cluster manager, according to some implementations.

FIG. 3 is a flowchart of a process 300 that may be used, according to some embodiments. As discussed above, the developer of the pod 225 may benchmark the pod 225 for a particular hardware or node model (the pod-specific node 220B), and, in doing so, may decide on an appropriate resource request (for the resource requirements) and various limits. These resource requests may include, by way of example: a CPU request (CR) for the deployment—this may be based on the pod-specified node 220B; and a CPU limit (CL) for the deployment—this may also be based on the pod-specified node 220B. By way of example, some systems permit such requests to be made in CPU limits, for example, in resolutions of milliCPU. Although these resources are specified for CPU-related resources, such resources may also, where permitted, include aspects such as memory, I/O bandwidth, etc.

In operation 305, a current deployment node 220A that is currently available may be identified as a target for provisioning the pod 225 by the scheduler 212. In operation 310, the scheduler 212 may access the resource requirements, such as the CR and CL, of the current deployment node 220A from, e.g., the information about the deployment node 220A stored in the PIDS 216. In operation 315, the RAC 214 may then compare the current deployment node 220A resource requirements, such as the CR and CL, with the benchmarked hardware model pod-specified node 220B resource requirements.

In operation 320, the CRs and CLs, and possibly other performance metrics are compared. If these metrics for the current node 220A and the benchmarked pod-specified node 220B do not differ (320:N) (e.g., possibly by some threshold value), then the process 300 may close 325, and normal provisioning of the pod 225 may take place.

If the current node 220A and the benchmarked pod-specified node 220B differ (320:Y), then, in operation 330, the analytic engine may recalculate the resource request and the resource mode. By way of example, these recalculations may include determining a relative or adjusted CR ($CR_{adj}$) for the pod 225 for the current node 220A that hosts the pod 225. The following formula may be used:

$$CR_{adj} = \frac{CR_{bench} * PPB_{bench}}{PPB_{cur}} \quad \text{Eq. 1}$$

where:
$CR_{adj}$ is the adjusted (or relative) CPU or core request in units;
$CR_{bench}$ is the specified or benchmark CPU or core request in units for the node 220B that the pod is intended to run on, as specified by, e.g., the pod developer;
$PPB_{bench}$ is the processor performance benchmark for the specified CPU or core;
$PPB_{cur}$ is the processor performance benchmark for the current CPU or core of the current node 220A;

To illustrate this, the developer designs a pod 225 and specifies that the pod 225 should be run on a node 220B and use ten cores ($CR_{bench}$), where each of the cores has a relative performance value of ten ($PPB_{bench}$). This information may be stored, e.g., in the PIDS 216 along with various pod 225 information.

When it is time to provision the pod 225 at operation 335, the node 220A considered to be the best available node (e.g., the only available node, the node having the highest processing units, or a node that is most favorable according to some other criteria) is one that only has cores with only a relative performance value of five ($PPB_{cur}$). By applying Eq. 1, the $CR_{adj}$ value is twenty. This means that in order to provision the pod 225 to perform as intended by the pod 225 developer, that the provisioning request would have to ask for twenty cores on the lesser-power node 220A.

The CPU or core limit (CL) mirrors that of the CPU or core request (CL). By way of example, these recalculations may include determining a relative or adjusted CL ($CL_{adj}$) for the pod 225 for the current node 220A that hosts the pod 225. The following formula may be used:

$$CL_{adj} = \frac{CL_{bench} * PPB_{bench}}{PPB_{cur}} \quad \text{Eq. 2}$$

where:
$CL_{adj}$ is the adjusted (or relative) CPU or core limit in CPU/core units;
$CL_{bench}$ is the specified or benchmark CPU or core limit in units for the node 220B that the pod is intended to run on, as specified by, e.g., the pod developer;
$PPB_{bench}$ is the processor performance benchmark for the specified CPU or core;
$PPB_{cur}$ is the processor performance benchmark for the current CPU or core of the current node 220A;

To illustrate this, the developer designs a pod 225 and specifies that the pod 225 should be run on a node 220B and have a limit of twenty cores ($CL_{bench}$), where each of the cores has a relative performance value of ten ($PPB_{bench}$). This information may be stored, e.g., in the PIDS 216 along with various pod 225 information.

When it is time to provision the pod 225, the node 220A considered to be the best or optimal available node (e.g., the only available node, the node having the highest processing units, or a node that is most favorable according to some other criteria) is one that only has cores with only a relative performance value of five ($PPB_{cur}$). By applying Eq. 1, the $CL_{adj}$ value is forty. This means that in order to provision the pod 225 to perform as intended by the pod 225 developer, that the provisioning request would have to ask for a forty-core limit on the lesser-power node 220A.

Technical Application

The one or more embodiments disclosed herein accordingly provide an improvement to computer technology. For example, an improvement to container scheduling within a heterogeneous node cluster in order to optimize performance ensures that the scheduling is done in an expeditious manner.

What is claimed is:

1. A computer implemented method comprising using a processor of a cluster manager that operates on a cluster of heterogeneous computer nodes, the processor configured for:
receiving, by a scheduler of the cluster manager, a request to provision a container as a software container on a current node of the cluster;
accessing a performance information data store (PIDS) to obtain a record associated with the container that includes benchmarked performance metrics including container-required resources associated with a benchmark-specified node of the container;
accessing the PIDS to obtain a record associated with the current node of the cluster that includes current-node performance metrics associated with the current node;
comparing the benchmarked performance metrics with the current node performance metrics to determine that a difference exists and an extent of the difference; and
conditioned upon the difference existing:
adjusting, with a resource adjustment calculator (RAC), the container-required resources based on the determination of the extent of the difference; and
provisioning the container on the current node with adjusted container-required resources.

2. The method of claim 1, wherein the cluster and the container are managed by a container-orchestration system.

3. The method of claim 1, wherein the container-required resources comprise a central processing unit (CPU) request (CR) and a CPU limit (CL).

4. The method of claim 3, wherein the RAC adjusting comprises:
determining a $CR_{adj}$ value according to the equation:

$$CR_{adj} = \frac{CR_{bench} * PPB_{bench}}{PPB_{cur}}$$

where:
$CR_{adj}$ is an adjusted (or relative) CPU or core request in CPU/core units;
$CR_{bench}$ is a specified or benchmark CPU or core request in units for a node that a pod is intended to run on;
$PPB_{bench}$ is a processor performance benchmark for the specified CPU or core;
$PPB_{cur}$ is a processor performance benchmark for a current CPU or core of the current node;

and
determining a $CL_{adj}$ value according to the equation:

$$CL_{adj} = \frac{CL_{bench} * PPB_{bench}}{PPB_{cur}}$$

where:
- $CL_{adj}$ is an adjusted (or relative) CPU or core limit in units;
- $CL_{bench}$ is a specified or benchmark CPU or core limit in units for the node that the pod is intended to run on;
- $PPB_{bench}$ is the processor performance benchmark for the specified CPU or core;
- $PPB_{cur}$ is the processor performance benchmark for the current CPU or core of the current node.

5. The method of claim 1, wherein performance metrics are selected from the group consisting of:
- a processor performance benchmark (PPB);
- a type of node;
- a model of the node; and
- a node performance indicator value.

6. The method of claim 5, wherein:
- the PPB is a Relative Server Performance Estimate 2 (RPE2); and
- the node performance indicator value is at least one of an xPerf and an rPerf value.

7. The method of claim 5, wherein the performance metrics comprise all of:
- the PPB;
- the type of node;
- the model of the node; and
- the node performance indicator value.

8. The method of claim 1, wherein the determining when the difference exists is based on thresholds of the node performance metrics.

9. A cluster management apparatus, comprising:
- a memory; and
- a processor that is configured to:
  - receive, by a scheduler of the cluster manager, a request to provision a container as a software container on a current node of the cluster;
  - access a performance information data store (PIDS) to obtain a record associated with the container that includes benchmarked performance metrics including container-required resources associated with a benchmark-specified node of the container;
  - access the PIDS to obtain a record associated with the current node of the cluster that includes current-node performance metrics associated with the current node;
  - compare the benchmarked performance metrics with the current node performance metrics to determine that a difference exists and an extent of the difference; and
  - conditioned upon the difference existing:
    - adjust, with a resource adjustment calculator (RAC), the container-required resources based on the determination of the extent of the difference; and
    - provision the container on the current node with adjusted container-required resources.

10. The apparatus of claim 9, wherein the cluster and the container are managed by a container-orchestration system.

11. The apparatus of claim 9, wherein the container-required resources comprise a central processing unit (CPU) request (CR) and a CPU limit (CL).

12. The apparatus of claim 11, wherein the RAC adjusting comprises causing the processor to:
determine a $CR_{adj}$ value according to the equation:

$$CR_{adj} = \frac{CR_{bench} * PPB_{bench}}{PPB_{cur}}$$

where:
- $CR_{adj}$ is an adjusted (or relative) CPU or core request in CPU/core units;
- $CR_{bench}$ is a specified or benchmark CPU or core request in units for a node that a pod is intended to run on;
- $PPB_{bench}$ is a processor performance benchmark for the specified CPU or core;
- $PPB_{cur}$ is a processor performance benchmark for a current CPU or core of the current node;
and
determine a $CL_{adj}$ value according to the equation:

$$CL_{adj} = \frac{CL_{bench} * PPB_{bench}}{PPB_{cur}}$$

where:
- $CL_{adj}$ is an adjusted (or relative) CPU or core limit in units;
- $CL_{bench}$ is a specified or benchmark CPU or core limit in units for the node that the pod is intended to run on;
- $PPB_{bench}$ is the processor performance benchmark for the specified CPU or core;
- $PPB_{cur}$ is the processor performance benchmark for the current CPU or core of the current node.

13. The apparatus of claim 9, wherein performance metrics are selected from the group consisting of:
- a processor performance benchmark (PPB);
- a type of node;
- a model of the node; and
- a node performance indicator value.

14. The apparatus of claim 13, wherein:
- the PPB is a Relative Server Performance Estimate 2 (RPE2); and
- the node performance indicator value is at least one of an xPerf and an rPerf value.

15. The apparatus of claim 13, wherein the performance metrics comprise all of:
- the PPB;
- the type of node;
- the model of the node; and
- the node performance indicator value.

16. The apparatus of claim 9, wherein the determining when the difference exists is based on thresholds of the node performance metrics.

17. A computer program product for a cluster management apparatus, the computer program product comprising:
- one or more computer readable storage mediums, and program instructions collectively stored on the one or more computer readable storage mediums, the program instructions comprising program instructions to:
  - receive, by a scheduler of the cluster manager, a request to provision a container as a software container on a current node of the cluster;
  - access a performance information data store (PIDS) to obtain a record associated with the container that includes benchmarked performance metrics including container-required resources associated with a benchmark-specified node of the container;

access the PIDS to obtain a record associated with the current node of the cluster that includes current-node performance metrics associated with the current node;

compare the benchmarked performance metrics with the current node performance metrics to determine that a difference exists and an extent of the difference; and conditioned upon the difference existing:
  adjust, with a resource adjustment calculator (RAC), the container-required resources based on the determination of the extent of the difference; and
  provision the container on the current node with adjusted container-required resources.

18. The computer program product of claim 17, wherein the container-required resources comprise a central processing unit (CPU) request (CR) and a CPU limit (CL).

19. The computer program product of claim 18, wherein, for the RAC adjusting, the program instructions further:
determine a $CR_{adj}$ value according to the equation:

$$CR_{adj} = \frac{CR_{bench} * PPB_{bench}}{PPB_{cur}}$$

where:
  $CR_{adj}$ is an adjusted (or relative) CPU or core request in CPU/core units;
  $CR_{bench}$ is a specified or benchmark CPU or core request in units for a node that a pod is intended to run on;
  $PPB_{bench}$ is a processor performance benchmark for the specified CPU or core;
  $PPB_{cur}$ is a processor performance benchmark for a current CPU or core of the current node;
and
determine a $CL_{adj}$ value according to the equation:

$$CL_{adj} = \frac{CL_{bench} * PPB_{bench}}{PPB_{cur}}$$

where:
  $CL_{adj}$ is an adjusted (or relative) CPU or core limit in units;
  $CL_{bench}$ is a specified or benchmark CPU or core limit in units for the node that the pod is intended to run on, as specified by;
  $PPB_{bench}$ is the processor performance benchmark for the specified CPU or core;
  $PPB_{cur}$ is the processor performance benchmark for the current CPU or core of the current node.

20. The computer program product of claim 17, wherein performance metrics comprise all of:
  a processor performance benchmark (PPB);
  a type of node;
  a model of the node; and
  a node performance indicator value.

* * * * *